J. L. KEIL.
SAW FILING MACHINE.
APPLICATION FILED FEB. 15, 1913.

1,072,384.

Patented Sept. 2, 1913.
4 SHEETS—SHEET 4.

WITNESSES

INVENTOR
John L. Keil.
BY Lou. Vaughom,
his ATTORNEY.

UNITED STATES PATENT OFFICE.

JOHN L. KEIL, OF PLAINVIEW, NEBRASKA, ASSIGNOR OF ONE-HALF TO SOLOMON A. KEIL, OF BANCROFT, NEBRASKA.

SAW-FILING MACHINE.

1,072,384.  Specification of Letters Patent.  Patented Sept. 2, 1913.

Application filed February 15, 1913. Serial No. 748,598.

*To all whom it may concern:*

Be it known that I, JOHN L. KEIL, citizen of the United States of America, residing at Plainview, in the county of Pierce and State of Nebraska, have invented certain new and useful Improvements in Saw-Filing Machines, of which the following is a specification.

My invention relates to improvements in hand-saw filing machines in which mechanism, for driving a rotary circular file, adapted to be set to carry the file at different angles to the toothed edge of the saw, is combined with other contrivances to alternately clamp and release the saw-blade and to shift said saw step-by-step endwise, in accordance with the gage, the spacing or size of the saw teeth being filed; and the objects of my improvement are, first, to provide a mechanism for manually driving a revolving circular file, that will normally retain the file standing away from the toothed edge of the saw-plate and that will allow the file to be manually moved against the teeth when filing them, and means for adjustably limiting such movement thereagainst; second, to provide gear-reversing mechanism and facilities for reversing the file on its carrying arbor to change the direction of the cut, whereby the bur may be made uniform, that is the same on the teeth of opposite sides of the saw and, at the option of the operator, on either the front or back edges of the teeth; third, to provide means of adjustment in conjunction with a saw-carriage mechanism designed for step by step movement to carry a saw longitudinally of its toothed edge, over spaces of two teeth at each step, whereby, all saws having numbers of teeth to the inch that are equal factors of or common multiples of the tooth gage of each other may be correctly carried by the same carriage in step by step movements for filing; fourth, to provide mechanism to justify or correct the positions of the carriage at the ends of the step movements and to positively but releasably lock the carriage in such justified positions; fifth, to provide a clamp to engage and correct the plane of only a small juxtaposed portion of the saw-plate to a desired angle to the file and to rigidly hold such part of the saw plate in this corrected position while the file is acting thereon, and to connect and time the clamp to release the saw-plate during the step movements of the saw carriage and to engage the saw-plate only while the carriage is in its justified and locked positions; sixth, to provide selective tabulation in conjunction with timing mechanism and the carriage actuating mechanism, to adjust the lengths of the step movements of carriages to agree with the tooth spacings of the saws they are designed to carry; seventh, to provide tabular means and connecting mechanism to set the file in position to enter the intermediate gullets or notches between those first filed, or for the opposite side of the saw, without changing the position of the saw in the carriage; eighth, to provide facilities for reversing the angle of the rotary plane of the file to the plane of the saw-plate and to nicely adjust said angles according to the desired fleam of the saw-teeth; ninth, to afford means for changing the angle of the rotary plane of the file to the toothed edge of the saw to directly effect the hookedness of the teeth; and other objects, hereinafter more particularly set forth, all of which I attain by the means and mechanism illustrated in the accompanying drawings, in which—

Fig. 2, an end elevation; Fig. 3, a fragmental plan, portions removed to reveal elements that are cased in; Fig. 4, an underside view of the tabulated timing-plate and step-adjusting pawl detent; Fig. 5, a front side elevation of the machine, excepting the file and its actuating mechanism which is removed from its tilting bracket support; Fig. 6, a front view of the angle of the main frame back of the tabulated angle of the longitudinally-shiftable file mechanism supporting frame; Fig. 7, a top view of the tilting bracket shelf detached from all other parts; Fig. 8, a rear side elevation of the assembled machine, projecting members broken off and a part cut away to reveal the pawl-controlling mechanism; Figs. 9 and 10 are top and under side views respectively of the pawl-controlling switch tongue and its supporting plate.

Throughout the several views the same parts are referred to by like reference numerals.

In all views of assembled elements, the movable parts are shown in the same position; different positions of operation being indicated by broken lines as further described.

The machine frame has end standards 13 and 14, having intermediate portions 15 and 16, looped toward the front and backwardly extended tops or arms 17 and 18; these standards are connected and spaced apart by the flanged bottom rail 19 and the top rail 20 having the wider backwardly-extending flange 21 on its lower edge. The lower ends of the standards are shaped with eyes 22 and are detachably hinged by thumb-nutted bolts 23 to corresponding eyes 24 on the clamps 25. This facilitates supporting the machine from a ledge, table or bench-top 26, at any desired angle and allows the clamps to be folded back, as indicated by broken lines 27 in Fig. 2, for packing the machine in a case or tool chest.

Ordinarily the saw 28 to be filed is supported with the plane of its plate horizontal, its toothed edge disposed toward the front into the loops of the frame standards and reciprocatingly carried endwise forth and back through these loops by the saw carriage in which it is releasably fastened. The saw carriage consists principally of a bar of T-shaped cross-section 29,—a T bar. The lower casing plate 30 and the top rail flange 21, disposed in the same horizontal plane and their adjacent opposed edges spaced apart to loosely receive therebetween the vertical pendent stem or web of the T bar, form a double track on which the imposed top flanges of the T bar slide from end to end through either way and in and out of the head of the machine. A row of countersunk perforations 31 through the pendent web of the T bar receives screws to fasten the carriage saw-plate grip, adjustable endwise, on the forward end thereof to accommodate long or short saws. This saw grip is made double of two bent arms 32 and 33, spaced apart and united in the integral yoke-head 34, by which they are seated along the foot of the T as shown. The intermediate bent portions of these arms are disposed laterally backward and bent to form vertically widened loops 35 to receive the reinforced backs of miter or tenoning saws. The loop in the forward arm 32 is shorter than the other to accommodate the taper of a common hand-saw blade. The arms terminate in the boss heads 36 and 36, disposed immediately under the yoke-head, and the thumb-screws 37 and 37 threaded up through these heads engage and fasten the saw-blade therein. This grip alone is sufficient for any short saw; but for long saws the rear end of the carriage is provided with a saw-handle grip, consisting of a top-plate 38 having an upturned base 39 attached to the T bar, a loose bottom-plate 40, and a thumb-screw 41 disposed vertically upward through the bottom-plate and the hand-hole of the saw-handle and threaded through the boss 42 on the underside of the top-plate. The back edge of the rear flange or top of the T bar, has teeth 43 forming an integral toothed rack or feed-bar throughout its length. By this means the carriage is engaged and given its step by step movements and locked in positions to receive the file in the gullets or notches between the teeth of the carried saw. The teeth of this feed-bar are preferably equilateral triangles in plan, the roots or bases and the sides of equal length; such being easily formed and serving well the purposes of feeding and locking the carriage.

For the purposes of this description and the tabulation of this machine, those alternate saw teeth that are bent or set laterally to throw their points to the right hand, when the saw is in working position, teeth down, will be styled "right" and those of the opposite bend or set, styled "left." And the file which must cut the back of one tooth simultaneously with its action on the front of an adjacent tooth, will be set "right," to file the fronts of right hand teeth and "left," for the fronts of the teeth on the opposite side. The shift from "right" to "left," or the reverse, is made by moving the file mechanism support, as indicated by the tabulations "left" and "right," shown in Fig. 5, and hereinafter more particularly described.

Figure 1:
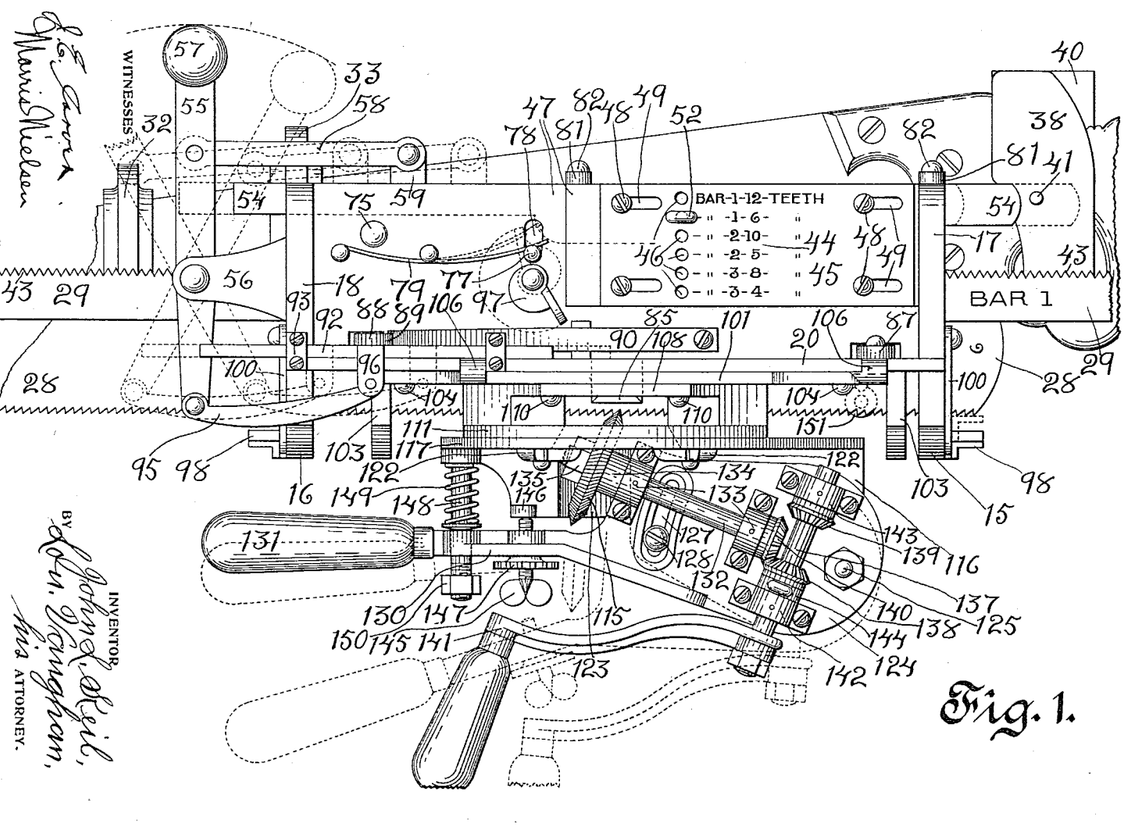
Figure 1 is a top view.

This machine is designed and tabulated for filing six different sizes of teeth, or spacings of teeth, designated in gage by the number of teeth to one inch of length of their cutting edges. Three interchangeable saw carriages are employed, designated by the mark "Bar 1," as shown in Fig. 1, and two other carriages, not shown, marked "Bar 2" and "Bar 3," respectively; all of identical construction, except as to the pitch of the toothed rack or the number of teeth to the inch of length. Each carriage is adapted to correctly carry two different gages of saws, according with the tabulation shown. The table 44 on the timing-plate 45, facilitates selecting the carriage required, as well as the placing of the timing-plate to correctly time the carriage actuating mechanism. The cross row of six perforations 46 is disposed so that one perforation is in alinement with each line of the table. The timing-plate is fastened longitudinally-adjustable on the upper casing-plate 47 of the machine head by the screws 48 disposed through the slots 49 in the timing-plate. A series of perforations 50 are disposed in the subjacent casing plate so that one is in longitudinal alinement with each of the perforations in the timing-plate,—see Fig. 3. These lower perforations are varied longitudinally, as shown and indicated by the inclined broken lines 51, so that when a corresponding alined perforation of the timing-plate is brought to register therewith it will time the actuating mechanism for that carriage and gage of saw indicated by the corresponding alined line of the table. A tapered close-fitting set-pin 52 to be inserted in the perforations facilitates the convenient and accurate setting of the timing-plate.

The principle, mechanism and manner of operating either of the three carriages being substantially identical, a description of the application of one carriage suffices for all. As shown in the table, the applied carriage marked "Bar 1" will give the desired step movements for saws of the gages 12 and 6 teeth to the inch. The teeth on this bar are spaced six to the inch, so if the longitudinally-reciprocatable actuating pawl 53,—see Figs. 3 and 8,—moves the carriage one tooth-space of the rack at each impulse, the step by step movement will be right for saws of 12 gage; that is each step will be one-sixth of an inch, to bring every other or alternate tooth space to the file, for teeth either "right" or "left" side of the saw. For such a saw of 12 gage, the set-pin would be in the perforation alined with the top line of the table, which would place the timing-plate in position to allow the actuating pawl to engage and act over a space of only one tooth of the rack at each impulse. But as the saw shown inserted in the machine for filing, is 6 gage, the set-pin and timing-plate are shifted to the positions shown in Figs. 1 and 3, which allows the pawl to engage and act over a space of two of the rack teeth at each impulse, as described below.

A rectilinearly reciprocatable pawl-bar 54, is disposed to slide endwise between the back edges of the top and bottom casing plates; and rear end portions of these plates are offset to space them apart and form a chamber of sufficient depth for the carriage-actuating pawl 53 and its controlling mechanism,—see Figs. 1, 3, 4 and 8. An operating lever 55, disposed transversely of the forward or head end of the machine, is intermediately fulcrumed in the bracket 56, to oscillate in a horizontal plane; and has at its back end the upstanding handle 57, for manual operation. Intermediately of the handle end of this lever is jointed the forward end of the connecting-rod 58, its rear end jointed to the arm 59 on the back edge of the pawl-bar, to actuate the bar rearwardly and forwardly endwise by swinging the lever.

The pawl body is forked at its forward end to straddle a widened part of the pawl-bar and to receive therethrough the hinging pintle 60. The pawl is angular in plan having a tooth point 61 near the angle and a backwardly disposed forked arm 62 to straddle the pawl-bar which is here reduced in width to allow the pawl to swing far away from the toothed edge of the feed-bar. The wire springs 63 and 63 are disposed on the pawl-bar, one on the under side and one on the upper side, to engage the ends of the branches of the arm and yieldingly swing the pawl toward, and its tooth point into engagement with the teeth of the feed-bar. An upstanding stud 64 is disposed at the angle of the pawl near its tooth point; a like pendent stud 65 is disposed directly opposite on the underside of the pawl. The timing-plate has on its underside—see Fig. 4—the rib detent 66, to engage the stud 64 and detain the pawl swung out of engagement with the feed-bar. The position of this detent rib when the timing-plate is disposed as shown, for a 6 gage saw, is indicated by dotted lines in Fig. 3; detaining the pawl out of engagement until the stud passes off the rear end of the rib, letting the pawl swing into engagement; then there remains a space 67 between the head of the engaging pawl, as indicated by dotted lines, and the end of the casing, for further movement equal to two teeth of the feed bar; the length of a rearward step movement for a 6 gage saw.

Figures 2, 3, 4:
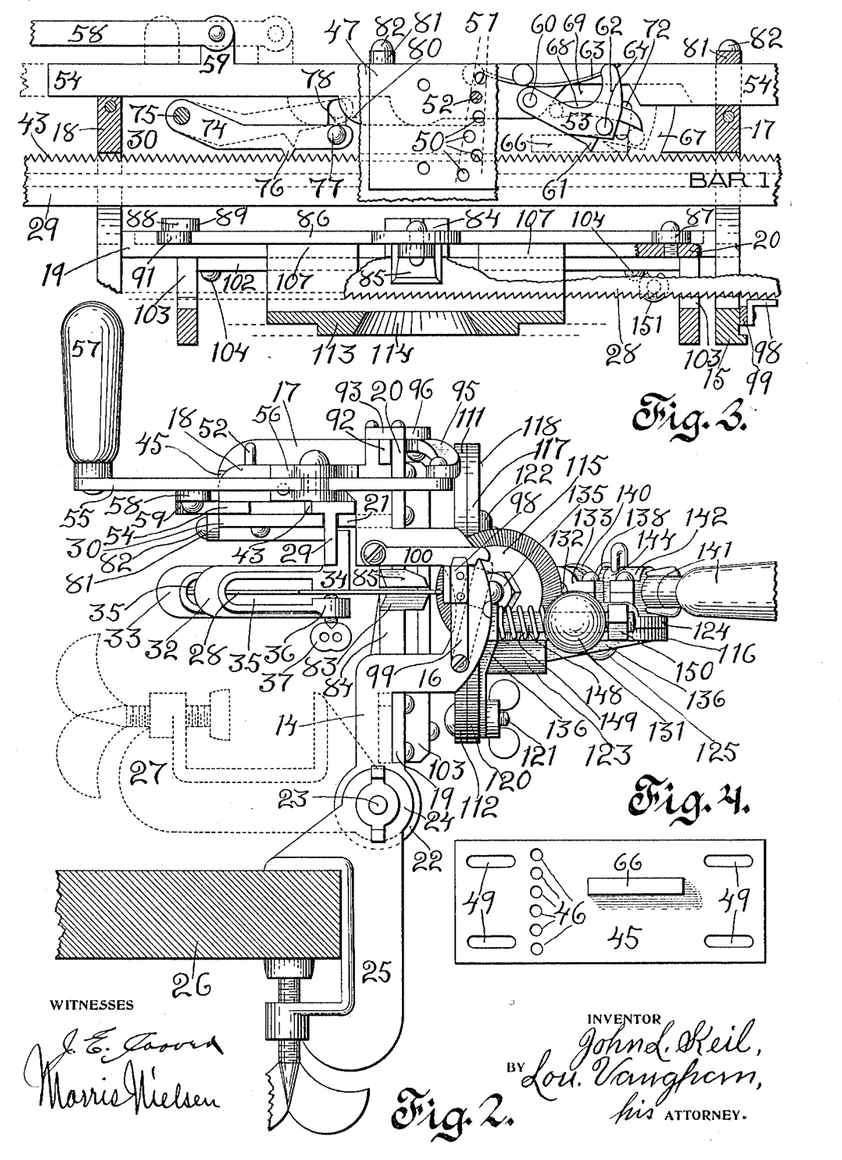

The switching tongue 68,—see Figs. 3, 8, 9 and 10,—is pivoted at its forward end on the top side of the switch-plate 69, which is attached to the bottom of the lower casing plate as shown. The broken line 70, in Fig. 9, outlines the opening through the bottom casing plate to form a chamber for this tongue; and also outlines the path of the pawl's pendent stud 65, which travels around the tongue in the direction indicated by the arrow. Near the point of the tongue an integral lug 71 projects downwardly through the concentrically curved slot 72 in the switch-plate, to limit the swing of the tongue. A spring 73 attached to the under side of the switch-plate, is set to engage the protruding end of this stud and yieldingly swing the point of the tongue toward the front side of the chamber. The lower stud of the pawl swings the tongue backward in passing to the end of the step movement, as shown in Fig. 3. When the end of the step movement is attained and the stud has passed the point of the tongue, to the position indicated in Fig. 9, the tongue swings forward to its normal position. In the return reciprocating movement of the pawl the lower stud must travel along the back of the tongue, swinging the top stud to clear the rear end of the detent and throwing the pawl back onto the narrow part of the pawl-bar, until released by the lower stud passing the pivoted forward end of the tongue. The swing of the released pawl is then arrested by its top stud coming in contact with the rib detent on the timing-plate, ready to be released in correct time for the next step impulse.

A justifying and locking lever 74,—see Fig. 3,—is disposed longitudinally in the chamber between the forward ends of the casing-plates and between the pawl-bar and the toothed edge of the feed-bar. A large pintle 75 is disposed vertically through the casing-plates and the intervening forward end of the lever, leaving the rear end free to swing across the space between the pawl-bar and the toothed edge of the feed-bar and in the same plane. This lever has toward its swinging end and on its front edge an integral hardened tooth 76, of corresponding angular shape and to engage the teeth of the feed-bar. Vertical studs 77 are disposed top and bottom on the swinging end of the lever and through concentrically-curved slots 78 in the casing-plates. Wire springs 79,—see Figs. 1 and 8,—are disposed on the top of the top-plate and the bottom of the bottom-plate to engage the protruding ends of these studs and yieldingly swing the lever to press its tooth into engagement with the teeth of the feed-bar. A rounded shoulder 80 on the front edge of the pawl-bar engages the back of the swinging end of the locking lever, when the bar slides forward to return the pawl after a rearward step movement of the saw carriage, forcing the hardened tooth into unyielding engagement, to correct and lock the feed-bar in its longitudinal positions at the ends of step movements. The vertical yokes 81 and 81 span the space between top and bottom casing-plates and bear across the back edge of the pawl-bar. With the attaching screws 82 these yokes serve as adjustable bearings against the back of the pawl-bar to take up the wear and to hold the shoulder unyieldingly against the locking lever.

The saw-clamp comprises a stationary lower jaw 83 on the pedestal support 84 footed centrally on the lower rail 19 of the machine frame. An opposed vertically-movable upper jaw 85 is pivotally seated at the center of the clamp lever 86 disposed longitudinally beneath the forward edge of the casing and adjacent to the top rail 20 of the machine frame. The rear end of this lever has an arm 87 disposed upwardly through the casing plates and the end of this arm is fulcrumed on the back of the rail as shown. An upstanding hooked arm 88 on the forward end of the clamp lever is disposed up through the casing-plates and terminated in the rearwardly-standing hook 89 above the top plate. A spring 90,—see Figs. 1 and 8,—is disposed on the top-plate to engage said hook to raise the lever and yieldingly retain the clamp opened. An anti-friction roller 91 is carried by the hooked arm in a space between this arm and the top rail of the frame. The rectilinearly reciprocatable clamping-bar 92 is disposed above the anti-friction roller and carried by the guide clips 93 and 93 on the top rail. The inclined shoulder 94 on the lower edge of the clamping-bar engages the roller to depress the forward end of the clamp lever and close the clamp. The crooked connecting-bar 95 has its forward end jointed to the front end of the operating lever and its rear end jointed to the arm 96 on the clamping-bar. As the clamp acts only on a small area of the saw-plate it is correctly and firmly held for the action of the file.

Referring to Fig. 1, it will be apparent that the pawl-bar and the clamping-bar must always move in opposite directions. The parts are so timed that the shoulder on the pawl-bar engages the locking-lever, correcting and fastening the carriage in position before the shoulder on the clamping-bar closes the clamp at the end of the return movement of the pawl. Reversely, the clamp is released, then the locking-lever is released just before the rib-detent on the timing-plate lets the pawl into engagement with the feed-bar for the step movement of the carriage.

Figures 2, 8, 10:
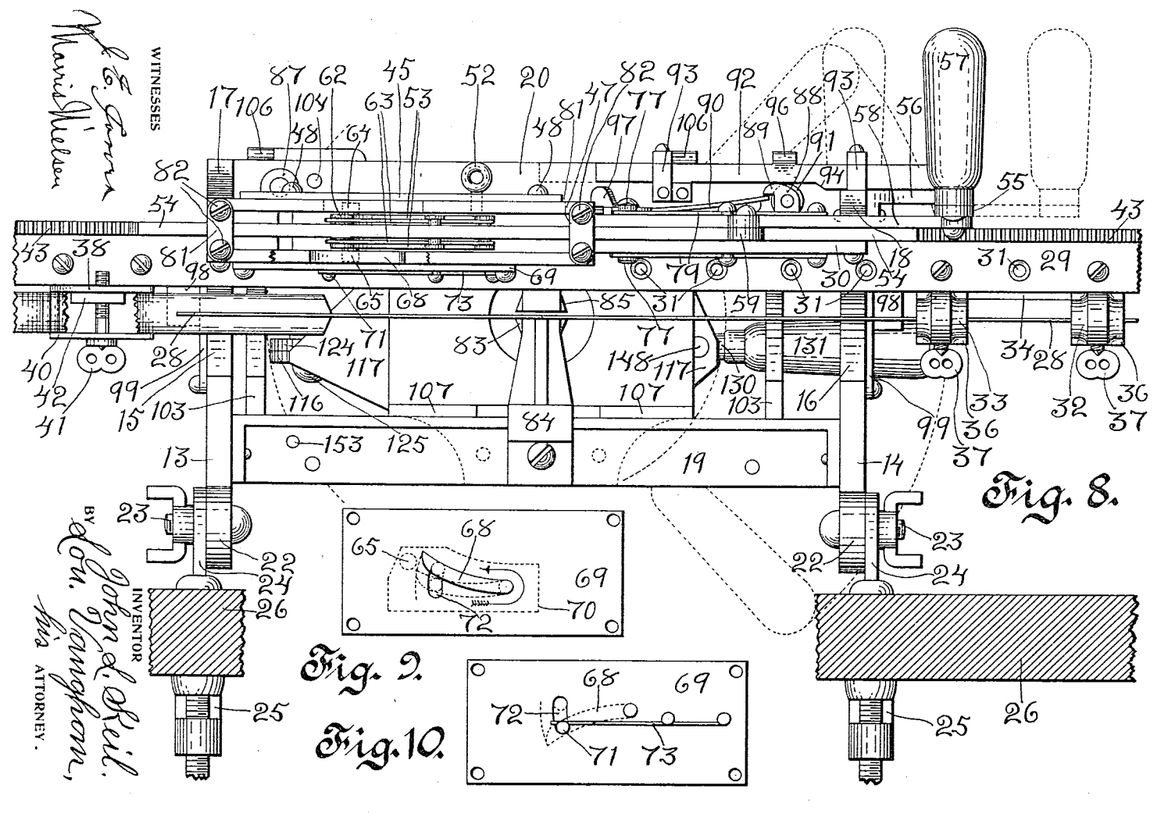

The thumb-cam 97,—see Figs. 1 and 8,— is pivoted on the top of the casing to engage the protruded end of the upper stud on the locking-lever. When this cam is turned, to the position indicated by the dotted lines in Fig. 1, it throws and retains the locking-lever to the position indicated by dotted lines in Fig. 3. The return movement of the pawl is thus arrested, by the shoulder on the pawl-bar impinging the backwardly-fastened end of the locking-lever. In this position the carriage is entirely disconnected from the actuating and locking mechanism and the saw clamp is open; the carriage with or without the inserted saw may now be slid in either direction or withdrawn and another carriage inserted.

Retiring stops or rests 98 of brass or other soft metal are disposed at the tops of the supports 99 pivoted on screws in their lower ends to the outsides of the forwardly-disposed loops 15 and 16 of the end standards of the frame. Notched latches 100 engage the top ends of the supports to retain the rests in a vertical position,—as shown in Fig. 2, to engage the toothed edge of the saw to bring it into correct alinement edgewise when fastening it in the carriage. The tops of the supports, as indicated in dotted lines, are then swung forward against lugs on the loops and into the notches at the ends of the latches to retain the rests away from the saw-teeth during rectilinear movements of the carried saw.

To connect the filing mechanism and bring it into requisite relation to the carriage and its movements, a base or supporting frame is disposed longitudinally-shiftable on the front of the main machine frame. This shiftable support consists of a top rail 101 and a bottom rail 102, of widths and spacing apart to agree with the top and bottom rails of the machine frame, but of less length and united at their ends by the vertical yokes 103, having intermediate looped portions agreeing with the looped parts of the standards of the machine frame. The screws 104 disposed through longitudinal slots 105 at the ends of the rails fasten the support longitudinally adjustable on the main frame. And hooked lugs 106 on the top rail overlap and slide along the top edge of the top rail of the main frame and backwardly disposed extensions 107 on the bottom flange of the centrally disposed bridge, imposed to bear and slide along on the top of the bottom rail, gives the base support an accurate longitudinally-adjustable seating.

The bridge is centrally looped forward to correspond with the forwardly disposed loops of the frame standards and the yokes of the shiftable support base, to allow the toothed edge of the carried saw to pass through,—see Figs. 1 and 3. At the back it has the vertical top flange 108 and the bottom flange 109 secured against the front face of the top and bottom rails of the support by the machine screws 110. The front is shaped with top and bottom curved edged vertical flanges 111 and 112; a central forwardly projecting boss 113, to form a circular rabbet seat concentric with the inner circular splayed edge 114, around a central bell-mouthed aperture, through which the circular revolving file 115, is swung edgewise to and from the teeth of the saw,—see Figs. 1, 2, 3, 5 and 8.

The tilting bracket by which angular direction of the cut of the file is changed, is shown in all the views with its shelf part 116, and the file mechanism that it carries, in a horizontal position. It being a rip-saw, shown inserted in the saw carriage for filing, the file is set to cut square across the blade to sharpen the teeth without fleam; a common practice for hand rip-saws. The base-plate 117 of the bracket,—see Figs. 1, 7 and 8,— which is preferably of metal cast integral with the shelf, is apertured centrally to seat it in the rabbet closely and turn edgewise on the boss, which thus serves as a stud journal on the front of the bridge; the front faces of the base-plate and boss are flush. The plane of rotation of the base-plate is parallel with the direction of movement of the carriage and at right angles to the plane of a saw-blade correctly set therein. The curved top of the base-plate is a graduated sector or limb 118. An index mark 119, on the face of the boss facilitates reading the angle to which the bracket is tilted either way from the angle of ninety degrees at which it is shown to be set. The curved bottom 120 is thickened, and slotted concentrically with the boss on which the bracket turns; the bolt 121 is seated centrally in the lower front flange of the bridge, disposed through the curved slot and provided at the front with a winged nut to fasten the bracket at any selected angle. The gibs 122 are seated between lugs on the face of the boss, extend outwardly to overlap the base-plate and have centrally-disposed screws threaded in the boss to tighten them against the face of the base-plate and prevent other than the tilting movement. The ends of the thickened slotted part of the base-plate are merged into the outwardly inclined integral braces 136 to support the shelf which is disposed at right angles to the base-plate; and the base-plate is extended at opposite edges to support the head and tail ends of the shelf. The shelf is disposed below the center of rotation to bring the imposed mechanism into required alinement and has, with other features to be further noted, the intermediate downward bend 123 to allow the passage of the file in swinging to and from the saw.

Figures 5, 6, 7:
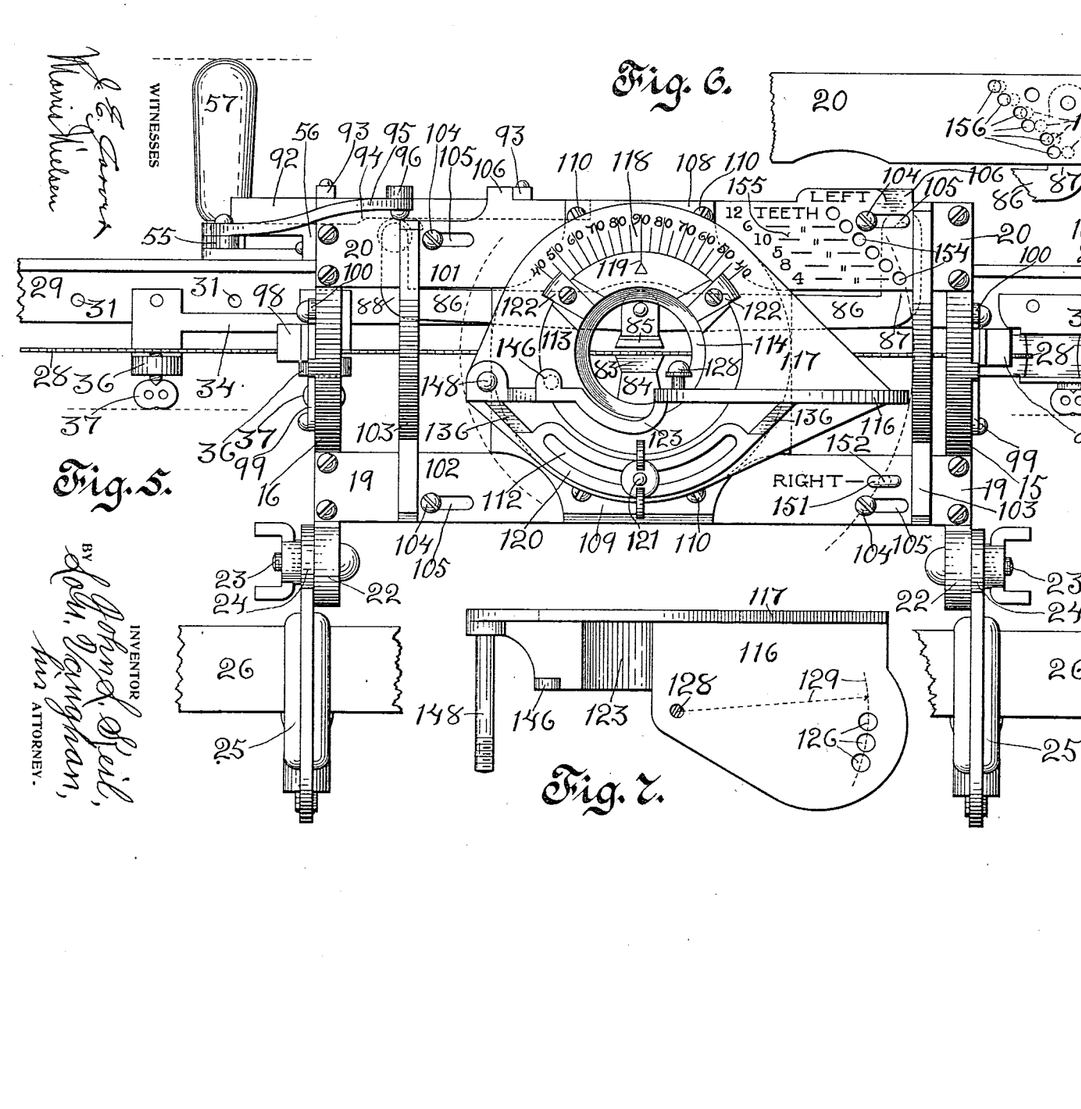

A swinging file carriage or bed-plate 124 has a broad end pivotally jointed flatwise on top of the broad longitudinally-extended tail end of the shelf of the tilting bracket by the vertical pivot bolt 125 disposed through the broad end of the plate and through one of the series of perforations 126 in the subjacent tail end of the shelf,—see Fig. 7. The opposite end of the bed-plate has the slot 127 curved concentrically with the pivot joint. A stud screw 128 is disposed through the slot and threaded in the shelf to hold the plate close down and prevent movement thereof other than to slidingly swing edgewise on the shelf. As indicated by the broken lines 129, the series of perforations in the shelf are ranged in a curve, concentrical with the stud screw, so that the curved slot is always concentric with the pivot-bolt seated in either of the perforations of the series. The front edge of the swinging end of the bed-plate is flanged upwardly and extended to form the flanged lever-arm 130, on the end of which is mounted the handle 131 by which the bed-plate is manually swung.

The file arbor 132, journaled in the boxes 133 seated on top of the bed-plate, is preferably disposed in axial alinement with the pivotal axis of the bed-plate, so that the disk file 115 mounted on the arbor will move substantially edgewise toward and from the saw by swinging the bed-plate. It is obvious that shifting the pivot-bolt of the bed-plate, to different positions in the series of perforations in the subjacent shelf, will directly change the hookedness of the saw teeth filed, irrespective of the tilt given to the bracket for fleam. The file arbor is also so disposed on the bed-plate that its axial line is in a plane agreeing with the median plane of the thickness of the saw-blade clamped for filing, when the tilting bracket is set so that the index mark indicates ninety degrees on the graduated sector. The axis of the boss, on which the tilting bracket is mounted, always remains in this same median plane of the saw blade; and the tilting bracket and file arbor always remain in axial alinement with each other irrespective of the swing of the bed-plate, the tilt of the bracket or the shift to right or left side teeth. The disk file is clamped between a collar 134 and a fastening nut 135 threaded on the end of the arbor in the usual manner. The file is seated at a point in the length of the mounted arbor to bring its principal cutting point coincident with the axial line of the tilting bracket, when the file is swung to its limit of movement toward the saw, and the pivotal joint of the bed-plate is located at the center of the series of perforations in the shelf. Shifting the pivotal joint of the bed-plate either way from the central position will also shift the cutting point of the file away from the axial center of the tilting bracket; but as this variation will be opposed for right and left side teeth, and equal if the bracket is tilted equally for right and left sides, no correction of this slight variation is necessary.

A driving shaft 137 is journaled across the pivoted broad end of the bed-plate at right angles to the file arbor and has mounted thereon the like reversely-faced miter gear wheels 138 and 139. These miter wheels are spaced apart so that either may be brought into engagement and the opposite one out of engagement with a like miter wheel 140 on the adjacent end of the file arbor, by shifting the driving shaft endwise. A handled crank 141 is mounted on the front end of the driving shaft for manual turning thereof. The space between the boxes 142 and 143, in which the driving shaft is journaled, is such that when the U-shaped shifting-block 144 is set astride the driving shaft between the box 142 and the back of the adjacent miter-wheel 138, this miter-wheel is retained in engagement with that on the file arbor, as shown. A right-hand-over turning of the crank will drive the cutting edge of the file downward. A like turning of the crank drives the file in an opposite direction, when the shifting-block is withdrawn, the shaft shifted endwise and the block inserted between the opposite box and miter-wheel for opposite engagement with the miter-wheel on the file arbor.

A thumb-screw 145 is threaded through the lever-arm on the swinging bed-plate to impinge the stop 146 on the shelf, by which the limit of movement of the file toward the saw is adjusted. A milled jam-nut 147 is mounted on the thumb-screw to fasten it securely at any desired setting.

A round guide-arm 148, based at the forward or head end of the shelf and tilting bracket, projects loosely through an opening through the lever-arm in the plane of its movement. A coil spring 149 is interposed around the guide-arm between its base and the lever-arm, to normally swing the file away from the saw. A nut 150 is threaded on the projecting end of the guide-arm to engage the front of the lever-arm and limit this swing. By removing this nut the bed-plate can be swung far enough to the front to allow the removal of the file from the arbor.

For right-hand side teeth, of saws of any gage, the set-pin 151 is placed in a perforation 152, indicated by dotted lines and designated in use by the word "Right",—see Fig. 5,—in the lower rail of the longitudinally-shiftable file mechanism support; a corresponding perforation 153 in the juxtaposed bottom rail of the main machine frame receives the point of the set-pin,—see Fig. 8. For left-hand side teeth the set-pin is shifted to one of the inclined row of perforations 154, designated for use by the word "Left", in the top rail of the shiftable support. The selection of the required perforation is facilitated by the adjacent table 155, on the front face of this rail; in which the gage, to which each perforation pertains, is designated by the number of teeth denoted in that line of the table disposed in alinement with the perforation. A series of perforations 156 to receive the point of the set-pin in the contiguous top rail of the main frame, is shown in Fig. 6; the longitudinal alinement with and the longitudinal variation from the straight row in the shiftable rail, to give the required left side position of the file support, is shown by the relative position of the straight row when the file is set for right side, as indicated by the dotted lines 154 in the same view.

While the operation may be reversed and varied in some respects, it is preferred to first, set the file support for right side teeth and raise the tail of the tilting bracket until the degree of fleam required is indicated on the limb. The soft-metal rests are latched up vertical, the thumb cam turned to fasten the step pawl and justifying and locking lever out of commission and the carriage, selected for the gage of saw to be filed, is inserted in its slideway to a central position. The saw is first loosely inserted in the plate and handle grips of the carriage which may be shifted endwise to bring the toothed edge of the saw in contact with both rests, if the blade is of sufficient length. At this juncture the locking lever is released, by turning off the thumb cam, and swinging the carriage operating lever forward far enough to correct and lock the carriage in one of its step positions, but not far enough to close the saw clamp. The file is now swung against the toothed edge of the saw, which being loose in the carriage, has its toothed edge held by hand against the rests and is shifted endwise until one of the right notches between the teeth coincides and receives the cutting point or edge of the file; this can be seen through the top opening of the bridge, as shown in Fig. 1. The saw blade is retained in this position against the rests while the thumb-screws of the blade and handle grips are turned home, which secures the saw in its correct position in the carriage. The rests are then swung and latched away from the saw teeth, and the carriage being again released is slid forward to start the filing at the heel or handle end of the saw blade. The timing-plate having been adjusted by placing the set-pin for the tooth gage of the saw, as indicated by the tabulation on the timing-plate, the filing of the right side is proceeded with:—by alternately giving a full rearward and forward swing of the carriage-operating-lever to make a step movement and clamp the saw blade, and then turning the file by the crank while pressing it toward the saw by the handle on the lever-arm until the adjusting thumb-screw strikes the stop and limits the cut. The depth of cut of the file may first be adjusted by the trial filing of a few teeth at any desired place in the length of the saw.

When the right side of the saw is filed the carriage is again released and the heel of the saw again brought to the file. The set-pin in the file support is shifted from right to left, into that perforation indicated by the tabulation to be for the required gage of teeth. The tilting bracket is given a reverse inclination, equal to that used for the right side. The nut is removed from the guide-arm to allow the bed-plate to swing outwardly so that the file may be removed and turned to seat its opposite side against the arbor collar, to reverse the direction of its cut. And the gearing of the driving shaft is reversed to turn the file arbor in an opposite direction. The filing of the left side is then proceeded with and completed in the same manner as was that of the right side.

If the next saw to be filed is of the same gage of teeth as the last one previously filed, it is obvious that its left side may be filed first, while the machine is set in the left side adjustment; then finishing with the right side adjustment. Or, if the saw is of a different gage, but having a number of teeth to the inch that is an equal factor of or a multiple of the number of teeth to the inch in the saw first filed, and therefore, the same carriage,—the same feed-bar,—is adapted to correctly carry either, it will be necessary only to first shift the timing-plate and file-mechanism-support by placing the set-pins where the gage of this next saw is indicated in the two tabulations.

I claim:

1. In a saw filing machine, the combination of a saw carriage, a toothed rack on said carriage, a reciprocatable pawl to engage said rack, a shiftable detent to vary the space of engagement of the pawl with the rack, and a switch point to reseat the released pawl on the detent.

2. In a saw filing machine, the combination of a saw-carriage, a toothed rack on the carriage, a reciprocatable pawl to engage said rack, a shiftable detent to vary the length of engagement of the pawl with the rack, and a switch tongue disposed to throw and carry the pawl, during its return movement, out of engagement with the rack and detent.

3. In a saw filing machine, a saw carriage, a rack-and-pawl feed mechanism, a shiftable detent to vary the range of engagement of the pawl with the rack, and predetermined stations at which to set said detent to effect different lengths of steps in the movement of the carriage, in combination with a shiftable file-mechanism support, and predetermined stations to selectively set said support to coincide with the selected lengths of steps of the saw carriage.

4. In a saw filing machine, the combination of suitable mechanism to carry a saw parallelly with its toothed edge in step movements and to vary the lengths of said steps, and predetermined stations to selectively gage the variations of steps to accord with different gages of saw teeth, a file-mechanism support mounted to shift parallelly with the step movements of the carried saw, a predetermined station at which to set said support for one side of saws of any gage, and predetermined stations at which to selectively set said support for the opposite sides of saws in accordance with the step movements for different gages.

5. In a saw filing machine, a carriage adapted to carry a saw longitudinally of its toothed edge, a toothed rack on said carriage, a reciprocatable pawl to engage the rack and move the carriage by steps, a shiftable detent to limit and vary the range of engagement of the pawl with the rack, predetermined stations, varied according to different gages of saw teeth, at which to set said detent, in combination with a shiftable file-mechanism support, a single station at which to set said support for the teeth of one side of saws of any gage, and stations varied in position to set said support for the teeth of the opposite sides in accordance with the varied steps of the carriage for saws of different gages.

6. In a saw filing machine, the combination of a saw carriage, a toothed rack of pitch coinciding with a tooth gage of saws and multiples of which pitch coincide with other tooth gages of saws, a reciprocatable pawl to engage said rack, and a shiftable detent adapted to be selectively set to limit the engagement of the pawl at each impulse to a space, of a number of teeth of the rack, coinciding with the tooth gage of the saw carried.

7. In a saw filing machine, a rack-and-pawl step feed movement, a shiftable timing-plate having a detent-rib to engage said pawl and limit its engagement with the rack, predetermined stations, at which to locate said timing-plate and detent, spaced in accordance with different gages of saws, and a table arranged on said timing-plate to indicate the stations for each saw gage.

8. In a saw filing machine, the combination of a slidable saw carriage, a toothed rack on the carriage, a reciprocatable pawl disposed to engage the teeth of the rack, and a shiftable detent adapted to be set at predetermined stations to limit the action of the pawl to spaces spanning different numbers of teeth of said rack.

9. In a saw filing machine, the combination of a slidable saw carriage having a toothed rack of pitch agreeing with the gage or tooth-spacing of a saw to be carried for filing, a reciprocatable pawl disposed to engage the teeth of said rack to move the carriage by steps, a shiftable detent stationed to limit the action of said pawl to a space spanning two teeth of said rack to step the carriage at alternate teeth of the carried saw and adapted to be shifted to a predetermined station to limit the action of said pawl to a space of one tooth of said rack to step the carraige at alternate teeth of another saw having twice as many teeth in an equal length.

10. In a saw filing machine, the combination of a slidable saw carriage adapted to carry a saw lengthwise of its toothed edge, a toothed rack on said carriage, a reciprocatable pawl disposed to engage said rack and move the carriage by steps, a switch tongue to retain the pawl, during its return movement, out of engagement with the rack, and a shiftable detent adapted to be set at different predetermined stations to limit the driving engagement of the pawl to distances spanning different numbers of teeth on the rack.

11. In a saw filing machine, the combination of a slidable saw carriage adapted to carry a saw in a direction parallel with its toothed edge, a toothed rack disposed on said carriage and of pitch agreeing with a certain tooth gage of saws, a reciprocatable pawl to engage said rack to move the carriage by steps, a shiftable timing-plate having a series of perforations and having a detent rib to engage the pawl and limit the length of its operative engagement with said rack, a subjacent stationary support for the timing plate having a series of perforations sequentially coincident with the perforations in the timing-plate but varied in the direction of the shift of the timing-plate to distances agreeing with or multiples of the pitch of said rack, and a set-pin to insert in different registering perforations to selectively fix the position of the timing-plate.

12. In a saw filing machine, the combination of a slidable saw carriage, a toothed rack on said carriage, a reciprocatable pawl to engage said rack, a shiftable timing-plate having a series of perforations and a detent rib to engage the pawl and limit the extent of its engagement with the rack, a stationary support for the timing-plate having a series of perforations each alined in the direction of movement of the timing-plate with one of the series of perforations therein and varied in the same direction distances according with the pitch of said rack, a set-pin adapted to be inserted in registering perforations to accurately place the timing-plate, and a printed table on said timing-plate, each line denoting a particular gage of saw and alined with that perforation to receive the set-pin therefor.

13. In a saw filing machine, the combination of a machine frame, a saw carriage slidably mounted on the frame, a toothed rack on said carriage, a reciprocatable pawl-bar on the frame, a spring-pressed swinging pawl mounted on the pawl-bar to yieldingly engage said rack to drive the carriage by steps, a switch tongue to swing and lock the pawl out of engagement with the rack during the return movement of the pawl after each driving impulse, a spring actuated locking-lever fulcrumed on the frame and having a tooth to engage the rack, and a shoulder disposed on the pawl-bar to engage the locking-lever and swing it into unyielding engagement with the rack during the last part of the return movement of the pawl.

14. In a saw filing machine, the combination of a machine frame, a saw carriage slidably mounted on the frame and adapted to hold and carry a saw blade endwise of its toothed edge, a toothed rack on said carriage, a reciprocatable pawl-bar on the frame, a spring-pressed swinging pawl mounted on said pawl-bar to yieldingly engage said rack and drive the carriage by steps, a switch tongue to swing and lock the pawl, in the return part of its movement, out of engagement with the rack, a spring actuated locking-lever pivoted on the frame and having a tooth to engage the rack, a shoulder disposed on the pawl-bar to engage the locking-lever and swing it into unyielding engagement with the rack during the latter part of the return movement of the pawl, and a thumb-cam pivoted on the frame to turn and lock the locking lever out of engagement with the rack and into the path of the shoulder to prevent a full return movement of said pawl.

15. In a saw filing machine, the combination of a machine frame, a clamping lever fulcrumed on the frame, a movable clamp-jaw mounted on the clamping lever, an opposed stationary clamp-jaw on the machine frame, a saw carriage mounted slidably on said frame and adapted to carry a saw-blade endwise of its toothed edge between said clamp-jaws, a toothed rack on said carriage, a reciprocatable pawl-bar mounted on the frame, a pawl mounted on said pawl-bar to engage the toothed rack, an operating lever fulcrumed on said frame and connected to reciprocate said pawl-bar to move the carriage by steps, a reciprocatable clamping-bar mounted on said frame, connected to said operating lever and having a shoulder disposed to engage the clamping lever to close said clamp after the carriage has reached the end of a step.

16. In a saw filing machine, the combination of a principal frame, a stationary clamp jaw on said frame, a clamping lever fulcrumed on said frame, a movable clamp jaw mounted on the clamping lever and opposed to said stationary jaw, a saw carriage mounted slidable on said frame to carry a saw blade endwise of its toothed edge between said clamp jaws, a toothed rack on said carriage, a toothed locking lever pivoted on the frame to swing into engagement with said rack, a reciprocatable pawl-bar mounted on said frame, a pawl on said reciprocatable bar to engage said rack, a reciprocatable clamping bar mounted on said frame and having a shoulder to engage the clamping lever and close the movable jaw on the interposed saw blade, an operating lever fulcrumed on said frame and connected to said reciprocatable clamping bar and to said reciprocatable pawl-bar, and a shoulder on said pawl-bar to engage close and lock the locking lever into engagement with the rack by a return movement of the pawl-bar, before the shoulder of the clamping bar engages and closes the clamp at the end of this movement.

17. In a saw filing machine, the combination of a machine frame, a saw clamp mounted stationarily on said frame, a saw carriage slidably mounted on said frame to carry a saw blade endwise between the jaws of said clamp, means to fasten the saw blade to said carriage, and rectractile rests on the frame to facilitate placing the toothed edge of the saw blade in alinement with the direction of movement of the saw carriage and in correct relation to the jaws of the clamp.

18. In a saw filing machine, the combination of a machine frame, a saw clamp stationarily mounted on said frame, a saw carriage slidably mounted on said frame and adapted to grip a saw blade and carry it endwise between the jaws of said clamp, retractile rests mounted on said frame to temporarily engage the toothed edge of the saw blade to place it on the carriage in correct relation to said clamp and its own direction of movement.

19. In a saw filing machine, in combination, a principal frame, a feed-bar of T-shaped cross-section having rack teeth along one edge and mounted for longitudinal movement on said frame, laterally-looped longitudinally-spaced saw-grip arms connected by a base yoke mounted for longitudinal adjustment on the stem or web of said T-shaped feed bar, and thumb-screws disposed through the ends of the arms toward their bases on the yoke.

20. In a saw filing machine, a saw carriage, comprising a longitudinal bar of T-shaped cross-section, integral rack teeth along one edge of the T head, laterally looped saw-grip arms spaced longitudinally of the bar and connected by a yoke base mounted on the stem-web of the T-bar.

21. In a saw filing machine a saw carriage, comprising a T-bar having rack teeth along one edge, a saw-grip arm having a head mounted on said bar and an intermediate portion looped laterally to said bar, and a thumb-screw disposed through the end of said arm toward said head.

In testimony whereof I have affixed my signature in presence of two witnesses.

JOHN L. KEIL.

Witnesses:
BRUCE SIRES,
O. E. ENGLE.